Patented June 23, 1936

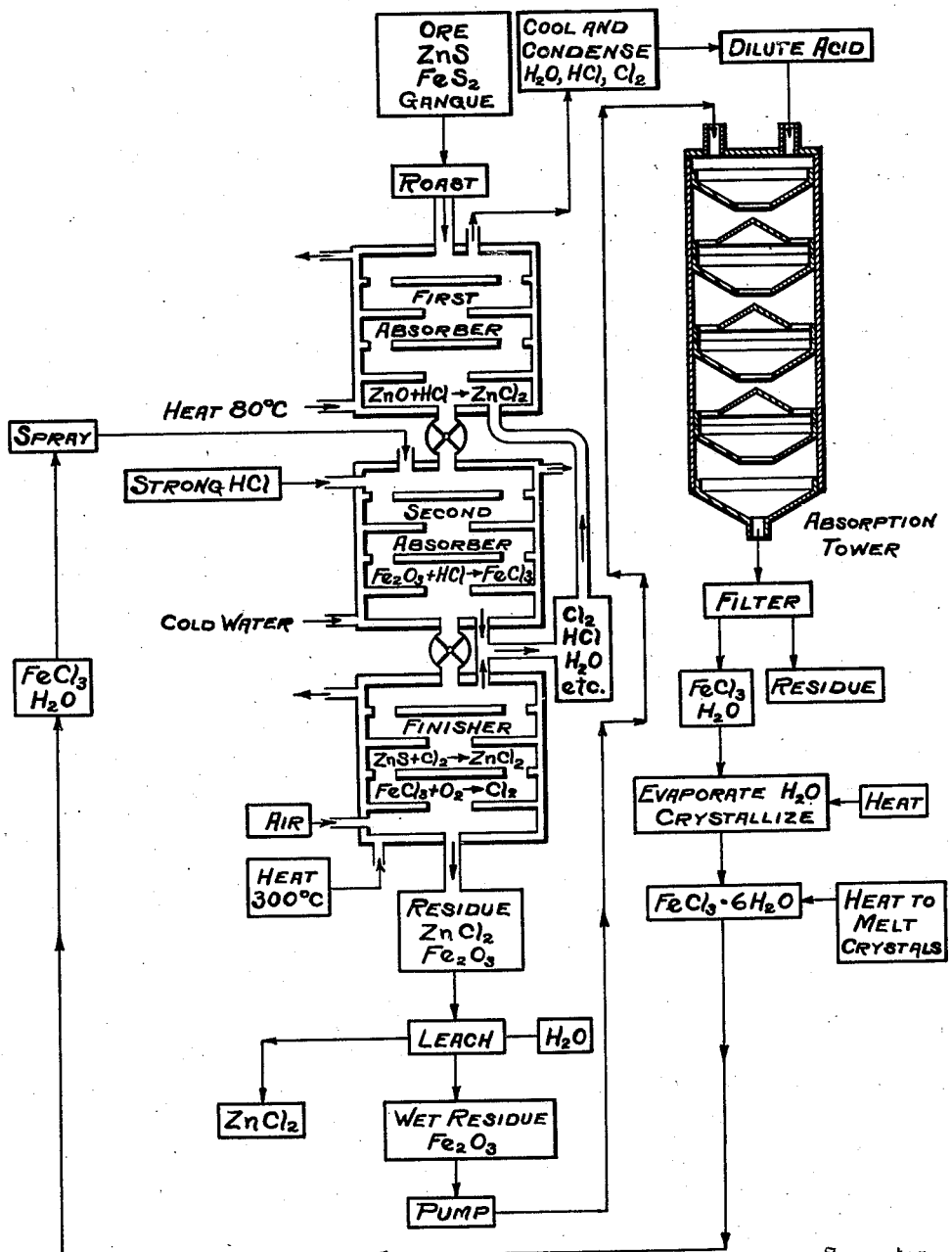

2,045,092

UNITED STATES PATENT OFFICE 2,045,092

METHOD OF CHLORIDIZING ORE MATERIALS

Thomas A. Mitchell, Denver, Colo., assignor to Hughes-Mitchell Processes, Incorporated, Denver, Colo., a corporation of Wyoming Application May 28, 1934, Serial No. 727,907

7 Claims. (Cl. 75—113)

This invention relates to the chloridization of ore materials by and in the presence of iron chloride, and particularly ferric chloride.

In accordance with the methods described in my prior Patents Nos. 1,943,332 and 1,943,333, an ore material, such as a roasted sulfide ore, may be chloridized by a procedure which involves treating the ore intermixed with ferric oxide by means of strong hydrochloric acid gas to form ferric chloride, after which the ore mixture is heated with air to a temperature at which iron chloride decomposes and forms nascent chlorine, which serves to chloridize further ore values. An efficient process requires that the original ore mixture containing the iron oxide be treated under conditions which give the largest chloride formation possible per unit of time, and that the use of large and expensive apparatus be avoided. Yet if one employs a small apparatus and tries to pass hydrochloric acid gas over the ore material at a rapid rate, a considerable amount escapes and is wasted. On the other hand, an initially concentrated gas becomes increasingly dilute as it reacts with the iron oxide and the rate of the reaction decreases; hence the presence of a large amount of gas is desirable.

In accordance with my prior patents, I have proposed, among other procedures, to add iron chloride directly to the roasted ore material in order to avoid some of the problems involved in forming the material in situ. The present invention relates to an improvement over these prior patents and has for its primary object the provision of a process in which iron chloride may be added directly to the ore material to be chloridized and the reactions may be materially expedited and the procedure rendered more efficient and economical.

The residue from my process contains a large quantity of ferric oxide after the ore metal values have been extracted therefrom, and a further object of this invention is to make use of this residue by so treating it that the iron oxide may be converted to iron chloride and the latter recovered and returned to process.

Another object is to provide a procedure whereby the chloridizing gases may be passed rapidly and in excess through the chloridizing zones and the excess of chlorine will be recovered and used to form further iron chloride for re-use in the process. Other objects will be apparent in view of the following disclosure.

In accordance with this invention, I propose to add iron chloride, and preferably ferric chloride, to the ore material to be chloridized, and to use the ferric oxide developed by decomposition of the iron chloride for the production of further iron chloride for cyclic re-use in the process. All of the iron chloride thus employed may be added as such, or, as is preferred, some of the iron chloride may be formed from iron oxide in the original ore material to supplement that which is introduced from the outside source. This added iron chloride may be obtained by treating the residues with fresh hydrochloric acid gas, chlorine gas and other chloridizing agents, but preferably by means of the waste gases derived from earlier stages of the process. Then, the iron chloride thus formed may be dissolved from the ore residue and returned to process. It is preferred to concentrate the iron chloride solution and return it either as dry iron chloride crystals or preferably as a spray of the salt dissolved in its water of crystallization.

Referring to the drawing, I have there illustrated as a diagrammatic flow sheet the preferred manner of carrying out this invention which involves the treatment of an oxidized ore material containing iron oxide so as to form and use iron chloride in the chloridization of various ore values, but it will be understood that the drawing and the following description are to be considered merely as illustrative of my invention and not as limiting the same. The drawing illustrates various features of this invention combined in one process, but the major steps may be supplemented or replaced by various other steps, in accordance with the nature of the ore being treated and the results desired.

Assuming that the raw ore contains zinc and iron sulfides together with the ore gangue and other materials, this ore may be ground to a finely divided condition and then roasted with air to form zinc oxide, with or without zinc sulfate, and iron oxide. Other oxidized ore materials or mixtures containing iron oxide may, of course, be used. A sulfide ore may be roasted with or without alkaline earth materials, in accordance with my prior patents. It may be roasted under reducing conditions which will form one of the lower oxides of iron, such as $FeO$ or $Fe_3O_4$, and ultimately result in the production of ferrous chloride. In such a case, the ore may be first roasted with excess of air or under oxidizing conditions, so as to remove the sulfide sulfur from the zinc and iron and form zinc oxide and/or sulfate together with ferric oxide, and then with a reducing gas, such as $CO$, to convert the ferric oxide to the lower oxide. This ferrous oxide or magnetic iron oxide, in the presence of water, will combine with chlorine or hydrochloric acid to form ferrous chloride. Various other procedures may be adopted to accomplish this end. It is to be understood that the ferrous chloride thus produced will dissociate the same as does ferric chloride, to form either nascent chlorine or hydrochloric acid gas when heated in the presence of air alone or air and water vapor. Either form of iron chloride may be used in the process during these early stages, but it is preferable that during the final step of heating the material to break down the iron chloride, the ferrous oxide there formed be converted to ferric oxide, since this material is insoluble in the leaching solutions.

My preferred procedure, as illustrated, involves roasting the iron sulfide of the ore to ferric oxide and converting the ferric oxide to ferric chloride and then using this higher chloride in the process. This is preferably accomplished by the procedure set forth in my prior patents. To this end, the raw ore is crushed to a finely divided condition, and if desired after a concentrating step, and then it is roasted with excess of air in a rotary tube or a Wedge type of roaster at as low a temperature as is consistent with the desired results. I prefer to allow the ore to burn autogenously while being agitated, and it is not necessary to remove all of the sulfide sulfur, since the residual zinc sulfide is readily chloridized by my process, especially if carried on in the presence of an alkaline earth metal chloride used in amount sufficient to fix all of the available sulfate radical as an insoluble alkaline earth metal sulfate and prevent the formation of zinc sulfate.

The chloridizing steps may be accomplished after the ore has been roasted by subjecting the roasted ore in a first absorber to the waste gases derived from later steps of the process in order to convert part of the zinc oxide to zinc chloride; then the material is passed to a second absorber where it is treated with strong hydrochloric acid gas, and preferably with an exclusion of any material amount of air, to convert the ferric oxide to a chloride. The chloridizing gas may be passed over the ore material rapidly during this and the preceding stage, since any excess of free or combined chlorine will be recovered at a later stage of the process. These chloridizing steps may be accomplished as described in my prior patents, or by other suitable procedure.

In the first absorber, the relative rates of ore and gas movement and the temperature may be so regulated that the ore material remains in a substantially dry condition, owing to the evaporation of the water of reaction and its removal on a countercurrent gas flow from the entrance end of the apparatus. This temperature may be 80° C. or higher, for the purpose, as explained in my prior patents. The mixture of zinc oxide, zinc chloride, zinc sulfide, iron oxide, whether ferrous or ferric or both, together with other refractory, difficultly chloridized compounds, such as zinc ferrate or ferrite, zinc silicate, etc., is then passed from the first absorber into the second absorber.

In accordance with this invention, an extra amount of iron chloride is added at this stage, or any other suitable stage, for the purpose of providing a large amount of reagent to react quickly with the refractory compounds. This iron chloride may be added as crystals which will be intermixed with the ore material by the stirring devices employed; but, if desired, it may be introduced as a spray of iron chloride in solution. If crystalline hydrated iron chloride is used, it may be melted in its own water of crystallization at a temperature suitable for that purpose. The ore material is thus provided with a large quantity of iron chloride which will be intermixed fully with the ore material and, in the case of the spray, flow into intimate contact therewith, where it can react readily with the zinc sulfide and other chloridizable ingredients.

If it is intended that the iron oxide, whether ferric or ferrous, within the ore material shall be also converted to iron chloride, then, as shown in the drawing, strong hydrochloric acid gas may be introduced into the absorber, where it is permitted to be absorbed into the substantially dry ore material to convert the iron oxide to iron chloride. The hydrochloric acid gas is preferably in a high concentration and without any material amount of air, so that the reaction will go on rapidly, in the conversion of the iron oxide to iron chloride. Any excess of zinc oxide will, of course, be converted to the chloride; and various direct reactions will take place between the ferric chloride and the zinc sulfide, ferrite, etc. which result in converting some of the refractory metal compounds to the chlorides and reducing the ferric chloride to the ferrous form. The temperature may be held below 90° C. so that ferric chloride may be stable in the presence of air. In the absence of air, this temperature may be allowed to run considerably higher, but it will be controlled as desired.

Thereafter, the material is passed to the finisher, in which the material travels in counterflow relation through the apparatus relative to a current of air, which is heated to about 300° C. or higher, if desired. The net result in this apparatus is first the melting of any iron chloride crystals in their water of crystallization and the evaporation of the water in the ore material. This water leaves the apparatus at its upper ore entrance end and so does not result in forming any large amount of hydrochloric acid, unless desired. As the ore material becomes heated, nascent chlorine is developed by the decomposition by heat of the ferric and ferrous chlorides and their reaction with the oxygen of the atmosphere. The chlorine serves to chloridize the residual zinc sulfide, silicate, ferrite, etc. which remain in the ore material, as will be understood. The iron is thus converted by this oxidation process to ferric oxide. The excess of chloridizing gases, air, water vapor etc. are by-passed around the second absorber, and these gases together with the excess of HCl from the second absorber are passed into the first absorber for converting zinc and other oxides to chlorides. This enforced flow of gas is caused by providing rotary ore feeding valves between the two absorbers and finisher and using suitable apparatus for conveying the gases in the desired directions. The chloridization steps of the process have been fully described in my prior patents, to which reference may be had. It may, however, be noted that each of the absorbers and the finisher may be provided with jackets, within which heating or cooling fluids are circulated to keep the ore material at the correct temperature as it is caused to descend over the shelves by revolving rakes. In the first absorber, the temperature may be held at 80° C. or higher by means of hot gases. Likewise, hot gases serve in the finisher to maintain a temperature of 250° C. or 300° C. or higher, while in the second absorber, cold water may be used to cool the ore material to 90° C. or less, if desired.

If it is desired to make hydrochloric acid gas in the finisher zone, then the ore material may be suitably wetted with water to a desired extent, which may be accomplished by allowing a desired portion of the water evaporated from the ore material to accumulate within the apparatus. Under these circumstances, the ferrous or ferric chloride will dissociate to form hydrochloric acid gas, together with more or less of chlorine, and the ferrous oxide will be oxidized by excess of air to ferric oxide. In such a case, the second absorber and the finisher may be formed as one piece of apparatus in which the ascending column of steam will be condensed on the cooled ore at the upper end and cause it to become materially wet thereby. Various other expedients may be adopted for this purpose. It, of course, is within the scope of this invention to recover the iron ultimately in the form of an oxide of bivalent iron, so that it will be converted to ferrous chloride for return to the process. This may be easily accomplished by reduction of the ferric oxide to FeO or $Fe_3O_4$ by any suitable reagent, and preferably by heating it with carbon or CO gas. Likewise, the iron sulfide in the raw ore may be roasted first with air to form ferric oxide and then under reducing conditions to form a lower oxide which will be converted to ferrous chloride by the chloridizing reagents, thus using only ferrous chloride in the process.

The residues from the finisher contain zinc chloride, or such other ore metal values as may be present, which may include compounds of lead, copper, nickel, silver, manganese, etc.; and this residue is then subjected to suitable leaching operations which, in the present case, are simply illustrated by the passage of water through the ore residue to dissolve the zinc chloride therefrom. If lead is present, the residue may also be leached with a hot sodium chloride solution; and other values will be suitably recovered, as desired.

In order to convert the ferric oxide in the residue to a chloride, it is preferred to treat the residue with a chloridizing reagent, and preferably in an absorption tower with the waste gases from the finisher and absorbers, or such other chloridizing gases as may be used for the purpose. As illustrated, the hot gases from the first absorber are cooled and the water vapor condensed, thus forming a weak acid solution of the chlorine and hydrochloric acid gas, and to which further water may be added if needed. The dilute acid and the wet ore residue from the leaching operation are passed into the absorption tower, where the ore particles fall from one to another of a series of alternately arranged conical baffles as they are attacked by the acid. This serves to convert all or a desired part of the ferric oxide to ferric chloride, depending upon the amount of acid available.

The ferric chloride thus formed is dissolved in the water present, or added, and may be readily separated from the residue by being drained therefrom or by a filter, if desired. This solution of iron chloride may be returned to either of the absorbers or the finisher just as it is, if the process warrants it; but it is preferable to evaporate some or all of the water and avoid wetting the ore materially, if a high content of zinc is present. It is preferable, for a zinc ore, to evaporate the water therefrom to such an extent that the iron chloride will crystallize with water of hydration. These crystals may then be conveniently mixed with the ore material at any desired stage. Ferric chloride with excess of water crystallizes as $FeCl_3.6H_2O$ or with a smaller number of molecules of water, if the latter is limited. Hence, it is not necessary to remove all of the water by evaporation. In the preferred process, these crystals are heated to that temperature at which they will melt in their water of crystallization; and I thus obtain the material in a form which may be easily introduced into the absorbers. This is best accomplished by keeping the solution hot and spraying it onto the ore material in the second absorber, where it flows into very intimate contact with the ore. Any suitable apparatus, including gravity feeders or pumps and sprayers may be used for introducing the iron chloride solution into the chloridizing apparatus.

By using a spray feed for the iron chloride solution, I avoid introducing air into the second absorber and thus make it possible to have any desired amount, and particularly a high concentration, of ferric or ferrous chloride present in this zone. This enables one to maintain a temperature in that zone above 100° C. or that point at which iron chloride would be decomposed by heat in the presence of air. For similar reasons, if the iron chloride is added as crystals, they should be fed onto the upper hearth of the absorber through a rotary valve which prevents admission of a material amount of air. In the presence of a large amount of ferric chloride, zinc sulfide and other refractory but chloridizable compounds will be rapidly and directly attacked by the ferric chloride and converted to chlorides, with a resultant reduction of the ferric to ferrous chloride. This takes place in the second absorber, and the reaction is particularly efficient if the heat of reaction is allowed to accumulate in a deep bed of the ore material and raise its temperature to a high degree, provided air is absent, as above explained. Hence, the reaction between the ferric chloride introduced as a strong solution or as crystals is materially promoted by the heat developed by the hydrochloric acid attacking the ferric oxide. It is to be understood that the ore material, while being chloridized in the absorbers and finisher, is in a substantially dry and gas permeable condition, as distinguished from an aqueous bath treatment, such as where the ore is suspended in an aqueous solution of ferric chloride or other chloridizing reagent. Water is necessarily present in the substantially dry ore material at various stages, as herein described, but the ore remains granular in character with open pores between the ore particles which may be readily penetrated by the gases and reagent solutions, and especially while it is being raked or stirred by rabble arms provided for the purpose.

It will now be appreciated that I have provided a method of introducing a large amount of iron chloride into any one of the chloridizing zones so that the chloridization of such refractory compounds as zinc sulfide, ferrite and silicate, may be rapidly and efficiently accomplished. In this way, I may re-use iron oxide and chloride in treating an ore which is low in iron; or I may supplement the iron chloride formed in the main stage of the process and thus insure the use of a very high concentration of reagent material.

Many advantages are inherent in this procedure, and various modifications of the process may be made, as will now be apparent to one skilled in the art, in order to apply the steps herein claimed to the different types of ores which may be treated.

Having thus described my invention, what I claim as new and desire to secure by Letters Patent is:

1. The method of chloridizing an ore material comprising the steps of adding iron chloride directly thereto, heating the ore mixture with air to a temperature at which iron oxide and a chloridizing gas is developed therefrom, while causing the gas to convert an ore metal value to a chloride, leaching the ore metal chloride from the material and providing a residue containing iron oxide, treating the residues with the excess of chloridizing gas used in the process and thereby forming iron chloride, separating the iron chloride from the residue and returning the iron chloride for chloridizing further ore metal values.

2. The method of chloridizing an ore material comprising the steps of introducing a solution of ferric chloride into the ore material, thereafter heating the mixture with air to a temperature at which the iron chloride is decomposed, with the formation of ferric oxide and a chloridizing gas, leaching out the soluble ore metal chlorides and providing a residue containing ferric oxide, treating the residue with a chloridizing reagent to form ferric chloride therein, dissolving the ferric chloride therefrom, and returning the ferric chloride as a solution for treating a further batch of ore material.

3. The method of claim 2 in which the ore residue is treated with an acid solution derived from the excess of chloridizing gas to form ferric chloride and the solution is separated from the residue for return of the reagent to process.

4. The method of chloridizing an ore material comprising the steps of mixing crystalline ferric chloride directly with the ore material, heating the mixture with air to a temperature at which ferric oxide and a chloridizing gaseous reagent are formed and causing the latter to chloridize the ore metal values, leaching out the soluble ore metal chlorides and providing a residue containing ferric oxide, treating said residue with a chloridizing reagent and forming ferric chloride therein, separating the ferric chloride from the residue, evaporating water therefrom to provide crystalline ferric chloride, and returning said ferric chloride crystals to the process.

5. The method of chloridizing an ore material comprising the steps of mixing ferric chloride directly with the ore material, heating the mixture with air to a temperature at which ferric oxide and a chloridizing gaseous reagent are formed and causing the latter to chloridize the ore metal values, leaching out the soluble ore metal chlorides and providing a residue containing ferric oxide, treating said residue with a chloridizing reagent and forming ferric chloride therein, separating the ferric chloride from the residue, and returning said ferric chloride to the process.

6. The method of chloridizing an ore material comprising the steps of providing an intimate mixture of the ore material with iron oxide, treating the same with a chloridizing reagent to form iron chloride in situ, adding iron chloride from an outside source to supplement the iron chloride formed therein, and thereby providing a high concentration of iron chloride within the ore material, heating the ore material with air to a temperature at which the iron chloride therein is decomposed to form a chloridizing gas and ferric oxide, and causing said gas to chloridize further ore metal values, separating the soluble ore metal chlorides from the residue, treating the residue with a chloridizing reagent to convert the iron oxide therein to iron chloride and returning said iron chloride to the process.

7. The method of chloridizing an ore material containing ferric oxide and a chloridizable ore value comprising the steps of adding ferric chloride directly thereto, treating the mixture with a gaseous chloridizing reagent to convert an ore metal value to the chloride form and convert the ferric oxide to ferric chloride, heating the ore material with air to form ferric oxide and chlorine, leaching out the ore metal chlorides, treating the residue with a chloridizing reagent and forming a solution of ferric chloride, separating the solution from the ore residue, and thereafter returning the ferric chloride thus formed for reuse in chloridizing a further batch of ore material.

THOMAS A. MITCHELL.